Oct. 3, 1961  C. R. MOREHOUSE  3,002,627
AGITATOR FOR ROTARY DRUM FILTER
Filed May 14, 1958
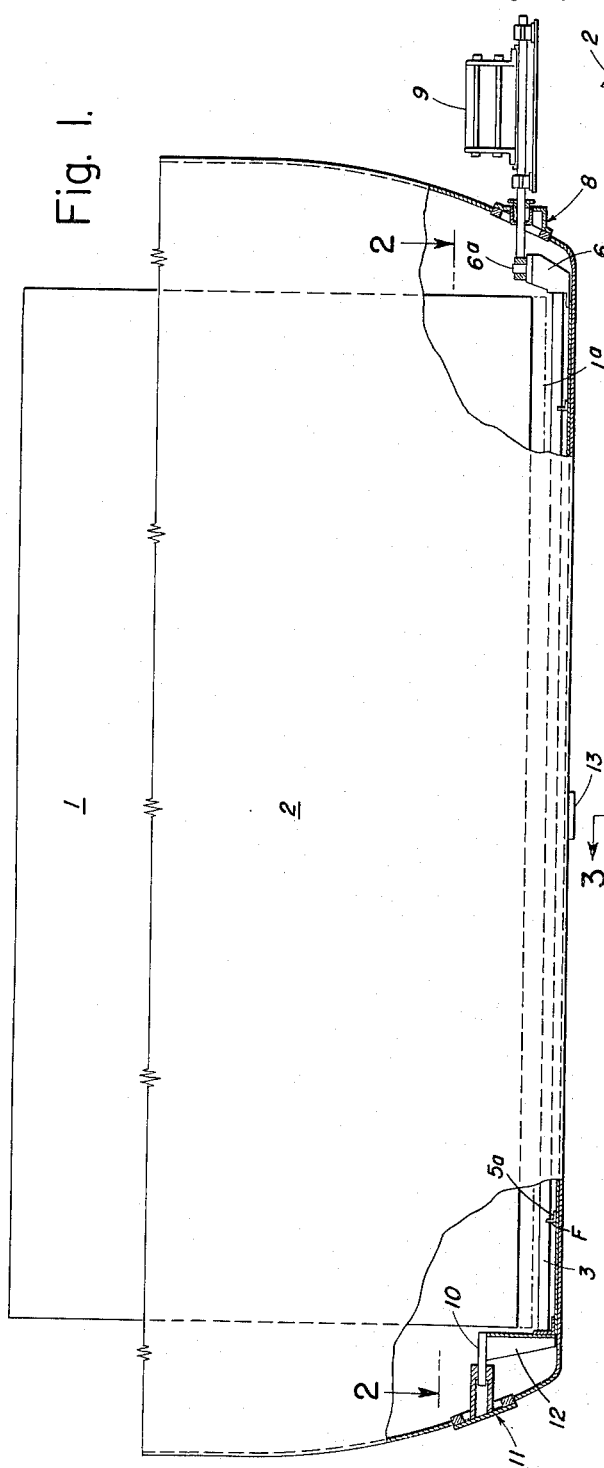
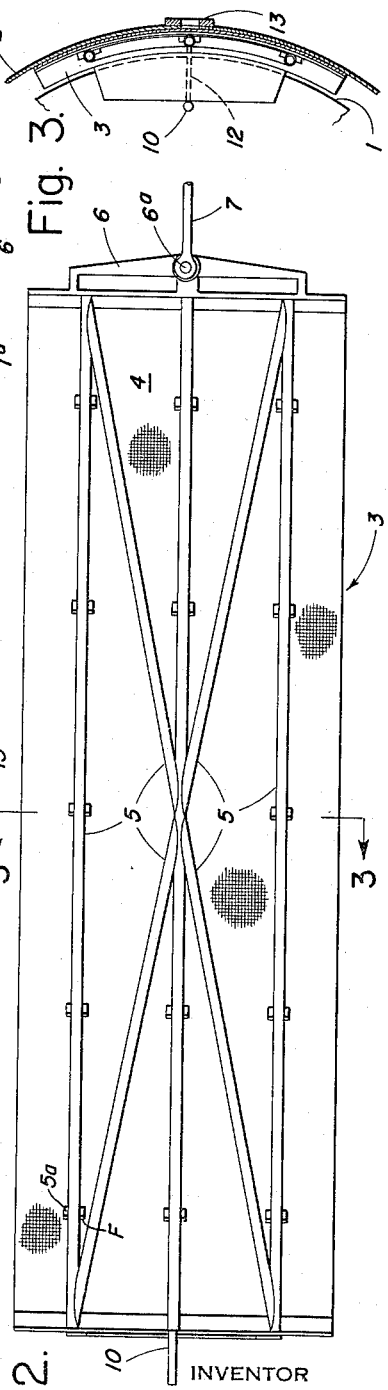
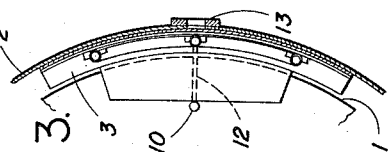
INVENTOR
Charles R. Morehouse
BY William S. Henry
ATTORNEY United States Patent Office 3,002,627
Patented Oct. 3, 1961

3,002,627
AGITATOR FOR ROTARY DRUM FILTER
Charles R. Morehouse, Alameda, Calif., assignor to Dorr-Oliver Incorporated, Stamford, Conn., a corporation of Delaware
Filed May 14, 1958, Ser. No. 735,280
3 Claims. (Cl. 210—383)

This invention relates to rotary drum filters and, particularly, to an improved agitator for use in the same.

Agitators for rotary drum filters of the vacuum or non-vacuum type, are well known and widely used to prevent suspended solids in a filter slurry from settling in the filter vat or tank. Prior agitator designs, utilizing paddles or rakes and swing-type structures for actuating the paddles or rakes, require expensive bearing mountings, large drives and excessive clearances between the bottom of the filter tank and the filter drum. Also, agitators heretofore employed with vacuum type rotary drum precoat filters have been found to interfere with formation of the precoat due to what appears to be excessive agitation. Further, in precoat filters, when the filtering cycle is completed, the used precoat or heel, dropped from the drum into the vat for discharge is not sufficiently disintegrated by prior agitator designs. While such precoat cake is not particularly tough or firm, it drops from the drum in segments which, if not broken up, will plug the drain connections of the vat necessitating special, time-consuming cleanout procedures.

The primary object of this invention, therefore, is to provide an agitator for a rotary drum filter adapted to fit into a close clearance tank, i.e. minimum clearance between the filter drum and the bottom of the slurry container or vat.

Another object is to provide an agitator for a precoat filter which does not interfere with formation of the precoat during the precoating cycle, but which is capable of disintegrating the residual precoat heel or cake at the end of the filtering cycle.

A further object of this invention is to provide an inexpensive and compact agitator which is particularly adapted to agitating filter slurries which have a tendency to coagulate or coalesce and also those filter slurries which tend to settle out of suspension before being separated by filtration to form the desired filter cake.

Another object of the invention is to provide an agitator for a filter which disintegrates coagulated solids in the filter slurry by a sifting or shaking action while simultaneously stirring the slurry to keep the solids suspended therein.

In order to understand and practice this invention it will now be described with reference to the example shown in the accompanying drawings in which:

FIG. 1 is a somewhat schematic elevational view, partly in section, of a rotary drum filter having a close clearance tank incorporating the agitator of the invention.

FIG. 2 is a top view of the agitator of the invention showing the screen and supporting structure therefor.

FIG. 3 is an end view of the agitator of the invention, illustrating the close clearance between the agitator, the rotary drum and the bottom of the tank.

Referring to FIG. 1, numeral 1 designates a drum mounted for rotation by any suitable means (not shown) within a tank or vat 2.

In the illustrated embodiment the tank is substantially completely filled with the slurry (not shown) so that 75–85% of the filter drum is immersed therein. As illustrated in FIG. 1, clearance between the vat 2 and the filter media 1a is held to a minimum allowing very little room for an agitator 3. In practice, such clearance is held at or between 2–4 inches. It is noted that on a precoat filter, numeral 1a will designate the precoat material which, in accordance with well known practice, is usually a cake of diatomaceous earth or similar material which serves as a fine filter medium.

As best shown in FIG. 2, the agitator 3 of the invention comprises an open mesh screen 4 of about ¾ inch thickness woven from standard wire, for instance No. 6 wire, to provide openings of about 1 inch. The screen is one piece and can be welded or otherwise attached to a supporting framework 5 which is formed to the contour of the vat bottom as shown in FIG. 3. If the screen is fastened to the members of the supporting frame 5 by means of clip members 5a welded both to the frame members and to the screen, these clip members present transverse agitating faces F adapted to act as stirring means tending to keep slurry solids in suspension. While the screen is shown in the drawings as attached to the bottom of supporting frame 5, it can also be attached on top of the frame. Obviously, screens can also be placed over both the top and bottom of the frame. The forward or drive end of the screen is provided with a yoke 6, a yoke pin 6a and a guide shaft 7 rotatably secured to yoke 6 as shown in FIGS. 1 and 2. Guide pin 7 extends through one head of the tank which is provided with a suitable stuffing box, generally designated 8, containing a bearing to slidably support the pin 7. The outer end of the drive pin is connected to a pneumatic, hydraulic or mechanical type vibrator 9. The rear end of the screen is also provided with a guide pin 10 which is mounted in a suitable bearing member 11 in the opposite end of the tank head or side wall. A rear yoke 12 connects pin 10 with the structure 5 of the screen.

As shown in FIGS. 1 and 3, the agitator screen 4 can closely overlie the tank drain outlet 13 to prevent coagulated solids in the tank from blocking this outlet. In other words the coagulated solids are sifted and disintegrated before they can enter the drain ports 13.

In operation, longitudinal vibratory motion is imparted to the agitator 3 by a suitable agitating device 9. The vibratory motion of the screen gently agitates the slurry in the vat to prevent settling and/or coagulation of suspended solids.

Where precoating is utilized, the screen 4 gently agitates the precoat slurry, during the precoat cycle, preventing the precoat solids from settling out of solution before contacting the filter media on the drum. During the subsequent filtering cycle the screen may be continually vibrated to agitate the filter slurry or it may be shut off when the relative motion between the screen, vat and drum is sufficient to maintain the suspension.

At the end of the filtering cycle, when replacement of the precoat becomes necessary, the vacuum holding the precoat to drum 1 is released and the residual cake dropped from the drum onto the open mesh screen 4. Vibration of the screen sifts and breaks up the cake thus enabling it to flow through the screen to be subsequently discharged from the vat drains. As previously stated, the sifting or shaker action disintegrates the cake into a finely divided form so that it may be readily drained from the vat. It is noted that the screen of this invention may cover substantially all of the filter drum immersed in the slurry, that is, it may be of a greater circumference than shown in FIG. 3.

While the agitator of this invention has been illustrated in connection with a rotary drum vacuum filter, one skilled in the art can readily adapt the agitator of this invention to the other type filters such as American disc type, Sweetland and the like. In any embodiment, the agitator of the invention will enable the use of relatively small vats and provide a simple, inexpensive agitator with resultant material savings in manufacture, operation and maintenance.

I claim:
1. In a rotary drum filter apparatus an improved slurry agitating arrangement comprising in combination a filter drum adapted to have filter cake formed externally thereon; a vat for holding a slurry to be filtered by the drum mounted for rotation on the vat, said vat having end walls and a bottom substantially conforming to the curvature of the drum so as to provide a relatively narrow spacing between said bottom and said drum, whereby the total width of the vat is minimized while affording relatively deep immersion of the drum into the slurry in the vat; a correspondingly curved agitator construction comprising curved screen means located in the spacing between said bottom and said drum and extending from the low point of said drum a substantial distance in both directions along the periphery of the drum; bearing means for mounting said agitator construction for movement thereof in a straight line parallel to the drum axis; and actuating means for imparting reciprocations along said straight line to said agitator construction.

2. The slurry agitating arrangement according to claim 1, wherein said screen means comprises an open wire mesh screen providing openings in the order of about 1 inch.

3. The slurry agitating arrangement according to claim 1, wherein said agitator construction comprises a correspondingly curved frame structure, and said screen means comprises an open wire mesh screen fixed to said frame structure.

References Cited in the file of this patent
UNITED STATES PATENTS

| | | |
|---|---|---|
| 803,550 | Callow | Nov. 7, 1905 |
| 2,075,097 | Dawrs et al. | Mar. 30, 1937 |
| 2,311,814 | Behnke et al. | Feb. 23, 1943 |
| 2,319,901 | Hall | May 25, 1943 |
| 2,415,675 | Crossley | Feb. 11, 1947 |
| 2,538,110 | Little | Jan. 16, 1951 |
| 2,932,402 | Logue et al. | Apr. 12, 1960 |